Patented June 23, 1953

2,643,241

UNITED STATES PATENT OFFICE 2,643,241

STABILIZATION OF POLYSULFONE RESINS WITH ORGANIC SULFIDES

Willie W. Crouch and John F. Howe, Bartlesville, Okla., assignors to Phillips Petroleum Company, a corporation of Delaware No Drawing. Application January 2, 1951, Serial No. 204,070

24 Claims. (Cl. 260—45.7)

This invention relates to new heteropolymeric resin compositions and their preparation. In another aspect this invention relates to a method for stabilizing polysulfone resins formed by the interreaction of sulfur dioxide with an unsaturated organic material, to decomposition by heat.

It has been known for a number of years that sulfur dioxide will react with numerous unsaturated organic materials to form heteropolymeric resinous products. Various prior art methods for the formation of these resinous materials include bulk polymerization, solution polymerization and emulsion polymerization.

Apparently the resin is produced from equimolar quantities of sulfur dioxide and the unsaturated organic material. The reaction appears to take place only in the liquid phase and it will proceed in the absence of catalysts only in the presence of actinic light, or it will proceed in the presence of any one of a large number of catalytic materials, most of which appear to have oxidizing properties, in the dark or in the light. Some of the more important catalysts for promoting this reaction are oxygen, hydrogen peroxide, ozone, various nitrates such as silver and lithium nitrates, nitrites, persulfates, chlorates, perchlorates, ascaridole, ozonized olefins, etc. Organic compounds which enter into the formation of such resins include mono-olefins, cyclo-olefins, substituted aliphatic olefins such as styrene, conjugated di-olefins such as butadiene, isoprene, cyclohexadiene, and the like, acetylenes and polyfunctional unsaturated compounds such as allyl alcohol, vinyl acetate, allyl ethyl ether, o-allylanisole, o-allylphenol, p-bromoallylbenzene, methyl undecylenate, undecylenyl alcohol, undecylenic acid, etc. When mixtures of such unsaturated organic compounds are used, the resulting resin appears to have been formed by a copolymerization of the unsaturated compounds with sulfur dioxide since its properties do not correspond to blends of resins produced from the individual unsaturated organic compounds and often have properties which are superior to any one of the resins produced from the individual unsaturated compounds. For many of the unsaturated compounds there appears to be a "ceiling temperature" above which the reaction does not take place, and in such instances it is necessary to conduct the resin-forming reaction at a temperature below the ceiling temperature and, when forming the resin from a mixture of organic unsaturated compounds, it appears desirable to conduct the reaction at a temperature below the ceiling temperature of the material having the lowest ceiling temperature. The resin-forming reaction is somewhat exothermic and generally some provision must be made for removing the heat of reaction. All of these features are more fully described in the literature.

These heteropolymers of sulfur dioxide and unsaturated organic materials are inherently inexpensive and have utility in numerous applications. However, utility of these resins has in the past been limited due in a large part to their lack of thermal stability, i. e., resistance to decomposition by heat, at temperatures such as from 200 to 500° F. Accordingly, these resins often cannot be employed satisfactorily in the production of molded articles. On being exposed to temperatures as high as 200° F. or higher over a short period, for example 1 to 3 hours, decomposition of the heteropolymer takes place to liberate sulfur dioxide and initial unsaturate reactant. The resin thus becomes porous and somewhat voluminous and is undesirable for the use for which it was intended. The addition of stabilizing agents to these heteropolymers has been suggested by workers in the art. These addition compounds include among others various organic solvent liquids, acrylic acid esters, vinyl acetate and acylating agents which act to remove occluded sulfur dioxide. However, these agents contribute a measure of stability to these heteropolymer resins only at temperatures at which such resins are not plastic and at which they cannot be molded. When heated to the elevated temperature necessary for molding operations such as 200 to 500° F. these stabilizing agents become ineffective.

We have discovered that heteropolymers of sulfur dioxide and unsaturated organic materials of the type described herein can be rendered highly resistant to decomposition by heat, when incorporated with certain organic mono- and poly-sulfide stabilizing agents. When added to the heteropolymeric resin such an organic sulfide imparts excellent thermal stability to the resin, many of which additive materials completely inhibit its thermal decomposition at molding temperatures.

Our invention is concerned with new polysulfone resin compositions, and with a method for increasing the thermal stability of polysulfone resins formed by sulfur dioxide and certain unsaturated organic compounds, i. e., effecting an increase in resistance of such resins to heat.

An object of our invention is to provide resin compositions comprising heteropolymers of sulfur dioxide and unsaturated organic compounds, exhibiting improved resistance to heat. Another object is to provide a method for increasing the thermal stability of heteropolymeric resins of sulfur dioxide and unsaturated organic compounds. Another object is to provide olefin-sulfur dioxide resin compositions thermally stable at molding temperatures. Another object is to provide for the utilization of certain mono- and poly-sulfide materials as agents for stabilizing olefin-sulfur dioxide resins. Another object is to provide for an increase in the thermal stability of butene-sulfur dioxide resins. Other objects will be apparent to those skilled in the art from the accompanying discussion and disclosure.

In accordance with our invention we incorporate with a heteropolymeric resin of sulfur dioxide and an unsaturated organic material as a stabilizer therefor, an organic sulfide characterized by the structural formula

wherein R is selected from the group consisting of Y,

and

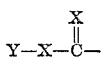

wherein Y is a radical selected from the group consisting of alkyl, alkenyl, aryl, alkaryl, aralkyl, cycloalkyl, cycloalkenyl, and such a radical containing at least one of the group consisting of sulfur and oxygen in an ether linkage wherein X is selected from the group consisting of oxygen and sulfur, wherein $n$ is an integer of from 1 to 5, and wherein the total number of carbon atoms does not exceed 20. In a preferred embodiment of our invention the unsaturated organic material which reacts with sulfur dioxide to form such a heteropolymeric resin of the type with which our invention is concerned is an unsaturated organic material selected from at least one of the group consisting of mono-olefinic organic compounds containing not more than 20 carbon atoms per molecule, and conjugated dienes, preferably diolefin hydrocarbons containing from 4 to 6 carbon atoms in the molecule. Our invention provides for resin compositions derived from sulfur dioxide and unsaturated organic materials, that are thermally stable at thermoplastic conditions and that can be widely utilized in the manufacture of molded articles.

Illustrative of the various organic mono- and polysulfides that are employed as stabilizers of our invention are di-tert-butyl disulfide, di-tert-butyl trisulfide, di-tert-hexyl polysulfide, di-sec-amyl trisulfide, tert-dodecyl vinyl sulfide, dibenzyl sulfide, phenyl ethyl sulfide, benzoyl persulfide, di(isopropylxanthogen) disulfide, bis-(tert-butylmercaptothiocarbonyl) disulfide

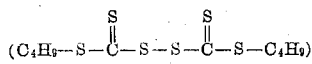

dicyclohexenyl disulfide, dicyclopentyl trisulfide, allyl xylyl disulfide, dimethyl disulfide diallyl disulfide, (2 - ethoxy)ethyl 2 - butenyl sulfide, and 3 - thiabutyl phenyl trisulfide. These stabilizer materials can be incorporated with the resin in any desired manner, the desired degree of stabilization generally being attained when the resin contains from about 0.1 to 15 per cent of its weight of the stabilizer. More generally a content of from 0.2 to 10 weight per cent of the stabilizer in the resin is adequate, and in many cases from 0.5 to 5 weight per cent is sufficient.

The organic sulfide stabilizer material can be incorporated with the resin in a number of ways, the important factor being that the additive, i. e., the stabilizer, be fully and intimately mixed with the resin. The stabilizer can be added to the finely powdered or precipitated dry resin by evenly distributing it thereon by means of a suitable mixing device, e. g., a stirrer means, ball mill, roll mill, or the like. The stabilizer can also be added as an aqueous solution or dispersion through the finely divided dry resin and thoroughly mixed therewith followed by evaporation of water. We usually prefer, however, to add an aqueous solution or dispersion of the stabilizer to a dispersion or suspension of the resin comprising the reaction mixture in which the resin was formed, particularly a latex as a result of the reaction of sulfur dioxide with an unsaturate, in aqueous emulsion. However, in any instance wherein only a portion of the additive tends to be carried down with the resin upon coagulation of the latex, it will be advantageous to incorporate the additive material directly with the filter cake, or with the powdered dry resin.

The latex containing the stabilizer is in the form of an emulsion and is extremely valuable in use of various impregnating and coating operations as treatment of paper, cloth, and the like, at temperatures higher than have been heretofore possible, since the resin contained in the latex is in a more stable form as regards its resistance to decomposition by heat.

The reaction of sulfur dioxide with an olefin reactant in aqueous emulsion is effected in the presence of suitable catalysts and emulsifying agents. The resinous product obtained in the form of an emulsion, or latex, can be stripped with air to remove unreacted sulfur dioxide and olefinic reactants, and other volatile impurities. It can be readily washed and the removal of additional impurities is accomplished in this manner. The dry resin is recovered from the latex by coagulation followed by washing and drying the coagulum, and is generally in a finely divided form.

One procedure in carrying out such a resin-forming reaction in aqueous emulsion comprises the preparation of an aqueous emulsion of the olefinic reactant with sulfur dioxide, in the presence of a suitable emulsifying agent such as a salt of sulfonic acid or a surface active salt of an amine, and a catalyst such as lithium nitrate, ammonium nitrate or the like. The emulsified reactants are agitated at a predetermined reaction temperature to effect the desired conversion after which the latex is stripped free of unreacted olefinic material and sulfur dioxide together with any volatile impurities. Separation of the resin from the latex is effected by coagulation of the latex with any suitable coagulating agent such as brine, alcohol, brine acid, solutions of electrolytes and the like, followed by water washing, filtration and drying of the product. The resinous material thus obtained is a soft, light, white powder, its solubility in various solvents depending upon the unsaturated reactant material employed, as for example when 1-butene is used, the product is completely soluble in acetone.

Further illustrative of olefinic compounds which may be used in forming the heteropolymers stabilized in accordance with our invention are 1-butene, 2-butene, propylene, isobutylene, pentenes, hexenes, cyclohexene, styrene, 1,3-hexadiene, alpha-methylstyrene, alpha-chlorostyrene, vinylacetylenes, vinyl chloride, vinyl bromide, chloroprene, 1,3-octadiene, and the like. If desired, a mixture of unsaturate reactant compounds, rather than a single unsaturate, can be utilized, in carrying out the resin-forming reaction with which this invention is concerned.

In carrying out the aqueous emulsion resin-forming reaction described above, it is generally desired to introduce a molar excess of sulfur dioxide into the reaction zone, generally in a mol ratio to the olefinic material of about 2:1 and in some cases as high as up to 5:1 or greater depending upon operating conditions, olefinic material employed, amount of aqueous medium, and the like, although it appears that even in such cases equimolar quantities of sulfur dioxide and the olefinic material enter into reaction.

Emulsifying agents which are applicable in the aqueous emulsion resin-forming reactions are those which are active in an aqueous medium which has a pH below 7, more often within the limits of 0.5 to about 2.0. Effective emulsifying agents include the long chain alkyl sodium sulfates and the branched chain aliphatic or aromatic sodium sulfonates, salts of organic bases, such as amine salts and quaternary ammonium salts. Examples of these materials are diamyl sodium sulfosuccinate, di-secondary-butyl naphthalene sodium sulfonate, dodecylamine hydrochloride, dodecylamine sulfate, and the like. The amount of emulsifying agent is that which is necessary to produce a stable emulsion of the ingredients generally from about 1 part to about 10 parts to 100 parts of total reactants. Catalysts applicable in the aqueous emulsion resin-forming reaction include such materials as nitrates of the alkali metals and ammonium, nitric acid, potassium persulfate, hydrogen peroxide, organic peroxides such as cumene hydroperoxide, peracetic acid and the like. The amount of catalyst employed in the aqueous emulsion solution will generally be within the limits of from 0.03 to 0.60 part per 100 parts by weight of reactants, more generally from about 0.15 to 0.45 part being generally preferred.

Temperatures for carrying out the aqueous emulsion resin-forming reaction will usually fall within the limits of −10 to 60° C., more often 10 to 50° C. or in some instances below −10° C. Freezing point depressants, for example glycerine, can be utilized in the aqueous emulsion when operating at temperatures below the freezing point of water. The emulsion of the "oil-water" type is generally employed with the ratio of aqueous medium to organic monomeric reactant material being generally between about 1.5:1 and 10:1 in parts by weight. The total pressure on the reactants is preferably at least as great as the total vapor pressure of the mixture so that the initial reactants will be present in liquid phase.

In a preferred embodiment of our invention we admix the organic sulfide stabilizer material as a solution or suspension, or in dry form, if desired, to a resin-containing latex formed by the reaction of sulfur dioxide with an unsaturated organic material in aqueous emulsion. The latex is then coagulated, and a stabilized dry resin is recovered as the desired product. The stabilizer material can be added to the resin product after coagulation of the latex prior to washing, i. e., to the filter cake, or if desired, after the filter cake is washed and just prior to drying. In any case it is important that there be thorough mixing of the stabilizer with the resin or resin-containing material.

It is to be understood that although we have set forth various specific means by which the stabilizer materials of our invention can be incorporated with the heteropolymeric resins, our invention is not to be limited thereby. Our invention broadly applies to the stabilization of any heteropolymeric resin formed by sulfur dioxide and unsaturated organic material, by incorporating therewith an organic mono- or polysulfide of the type described above, in any manner desired.

The advantages of the invention are illustrated in the following examples. The reactants and their proportions and their specific ingredients are presented as being typical and should not be construed to limit the invention unduly.

*Example I*

Several butene sulfur dioxide resin-containing latices were prepared in a 1 gallon autoclave at 100° F., for a 6.5 hour reaction period, in accordance with the following aqueous emulsion recipe:

| | Parts by weight |
|---|---|
| Commercial 1-butene [1] | 57.7 |
| Sulfur dioxide | 88.3 |
| Water | 180 |
| Ammonium nitrate | 0.5 |
| Maprofix MM [2] | 0.6 |

[1] The commercial 1-butene had the following composition:

| | |
|---|---|
| 1-butene | 63.2 |
| 2-butene-cis | 1.0 |
| 2-butene-trans | 12.5 |
| n-Butane | 13.4 |
| Isobutane | 4.6 |
| $C_3$ | 1.0 |
| Isobutylene | 3.6 |
| Butadiene | 0.7 |

[2] Sodium laurylsulfate dispersing agent commercially available in the form of a paste containing about 60 per cent solids.

At the end of the reaction period the reactor was opened and the unreacted sulfur dioxide was vented. Latices formed in the above manner are those utilized in the tests described in the following examples.

*Example II*

Varied amounts of an aqueous emulsion of 10 parts by weight of di-tert-butyl trisulfide in 30 parts by weight of water (1 per cent sodium lauryl sulfate as an emulsifying agent) were added to separate 40 cc. portions of an acid latex (i. e., containing unreacted $SO_2$) of the preparative method of Example I. In each case the stabilizer emulsion was added to the acid latex with agitation. The latex was then coagulated by addition thereto of methanol, the resulting slurry filtered, and the coagulum washed and dried in air at 130 to 150° F. for 16 hours, to provide the finished olefin-sulfur dioxide resin.

Each resin thus prepared was tested for thermal stability by placing it in a test tube partially immersed in a constant temperature bath of 325±2° F. for a specified test period. The per cent loss in the weight of the resin was determined at the end of the test period to provide a measure of the thermal decomposition that took place. Another portion of each resin tested, except that it contained no di-tert-butyl trisulfide, was simultaneously tested in exactly the same manner, as a control for evaluating the di-tert-butyl trisulfide as a stabilizer. These tests are summarized in the following tabulation:

|  | Percent Loss in Weight at End of Test Period (325±2° F.) | | |
|---|---|---|---|
| Test Period, Hrs. | 0.5 | 1 | 3 |
| Resin Sample A: | | | |
| Control | 9.0 | 12.7 | 21.0 |
| Percent [1] di-tert-butyl trisulfide added to latex— | | | |
| 0.3 | 4.8 | 6.2 | 10.7 |
| 0.5 | 3.7 | 4.8 | 8.6 |
| 5.0 | 0.4 | 0.5 | 0.9 |
| Resin Sample B: | | | |
| Control | 3.4 | 6.5 | 11.4 |
| Percent [1] di-tert-butyl trisulfide added to latex— | | | |
| 1.0 | 1.7 | 3.4 | 5.9 |
| 2.0 | 0.3 | 1.3 | 2.4 |

[1] Based on weight of dry resin in latex.

Example III

An aqueous emulsion of di-tert-butyl trisulfide was prepared in the same manner as described in Example II. An acid latex product of the process of Example I was coagulated, washed, and filtered as described in Example II. The aqueous emulsion of the di-tert-butyl trisulfide was then added to the resulting wet filter cake and thoroughly mixed therewith, after which the water was removed by vaporization. The resulting di-tert-butyl trisulfide-containing resin was then dried at 150 to 160° F. for 16 hours, and tested for thermal stability in the manner described in Example II. The same resin, except that it was free of di-tert-butyl trisulfide was simultaneously tested in exactly the same manner as a control.

In another test, an acid latex was produced in accordance with the procedure of Example I and partially neutralized to a pH of 6.0 with a aqueous ammonia. A portion of the partially neutralized latex was admixed with agitation with an aqueous emulsion of tert-butyl trisulfide the same as described above. The resulting latex admixture was then coagulated, and filtered, and the resulting coagulum comprising the stabilized resin was washed and dried, all in accordance with the procedure of Example II. Another portion of the partially neutralized latex was coagulated and treated in the same manner to produce the same resin, free from di-tert-butyl trisulfide, which was simultaneously tested in exactly the same manner as a control. The resins so prepared were tested for thermal stability in accordance with the procedure described in Example II. Results of these tests are tabulated as follows:

|  | Percent Loss in Weight at End of Test Period (325±2° F.) | | |
|---|---|---|---|
| Test Period, Hrs. | 0.5 | 1 | 3 |
| Control | 9.0 | 12.7 | 21.0 |
| Percent [1] di-tert-butyl trisulfide added: | | | |
| 2.0 (to wet filter cake) | 2.9 | 4.4 | 7.8 |
| 2.0 (to partially neutralized latex) | 1.7 | 2.3 | 3.5 |

[1] Based on weight of dry resin.

Example IV

A series of runs was made wherein aqueous emulsions of various organic mono- and polysulfides were added to separate samples of an acid latex prepared as described in Example I. The stabilizer emulsion was in each case added to the acid latex with agitation and the latex was then coagulated with methanol and filtered, and the resulting coagulum dried in air at 130 to 150° F. for 16 hours. Each of the resins so prepared was tested for thermal stability in accordance with the procedure of Example II. Portions of the same resin free from any organic sulfide stabilizer were tested in exactly the same manner as a control. The results of these tests are tabulated below:

|  | Percent Loss in Weight at End of Test Period (325±2° F.) | | |
|---|---|---|---|
| Test Period, Hrs. | 0.5 | 1 | 3 |
| Control | 3.4 | 6.5 | 11.4 |
| 2.0 percent [1] stabilizer added: | | | |
| di-tert-butyl polysulfide | 0.7 | 1.6 | 4.1 |
| di-tert-amyl trisulfide | 0.1 | 1.2 | 2.4 |
| di-tert-butyl disulfide | 1.0 | 2.0 | 3.2 |
| tert-dodecyl vinyl sulfide | 0.8 | 2.1 | 4.3 |

[1] Based on weight of dry resin in the latex.

Example V

Three series of tests were made in which several organic mono- and polysulfides, each in a separate methanol or n-pentane solution, as indicated below, was each added to separate portions of a dry resin obtained from an acid latex prepared in accordance with the procedure of Example I, by coagulating the latex, filtering the slurry, and washing and drying the coagulum in accordance with the procedure of Example II. After thoroughly commingling the dry resin and the sulfide stabilizer solution in each test the solvent was removed by vaporization. The resins thus formed were tested for thermal stability in accordance with the procedure of Example II. The unstabilized dry resin was tested simultaneously and in exactly the same manner as a control. The results of these tests are tabulated as follows:

|  | Percent Loss in Weight at End of Test Period (325±2° F.) | | |
|---|---|---|---|
| Test Period, Hrs. | 0.5 | 1 | 3 |
| Series A: | | | |
| Control | 8.1 | 10.8 | 16.6 |
| 2.0 percent [1] stabilizer added— | | | |
| Benzyl sulfide [2] | 2.9 | 4.7 | 9.4 |
| Phenyl ethyl sulfide [2] | 0.6 | 1.1 | 2.6 |
| Benzoyl persulfide [2] | 1.5 | 2.5 | 4.7 |
| Series B: | | | |
| Control | 5.1 | 7.6 | 15.0 |
| 2.0 percent [1] stabilizer added—bis (tert-butylmercaptothiocarbonyl) disulfide [3] | 0.76 | 1.27 | 2.95 |
| Series C: | | | |
| Control | 6.8 | 11.2 | 20.6 |
| 2.0 percent [1] stabilizer added—diisopropyl xanthogen disulfide [3] | 2.6 | 3.9 | 5.8 |

[1] Basis weight of dry resin.
[2] Methanol solvent.
[3] n-Pentane solvent.

Example VI

A resin-containing latex was prepared in accordance with the following aqueous emulsion recipe:

| Materials: | Parts by weight |
|---|---|
| 1-pentene | 46.7 |
| SO₂ | 88.3 |
| Maprofix MM | 0.6 |
| NH₄NO₃ | 0.5 |
| Water | 180 |

The reaction was conducted in a stainless steel autoclave reactor at 100° F. for eleven hours. The conversion was 98 per cent, based on the olefin charge. At the end of the reaction period, the reactor was opened and the SO₂ vented, and the resulting acid latex was coagulated with magnesium sulfate, filtered, and washed, and the coagulum was then dried in accordance with the drying procedure of Example II.

A methanol solution containing about 3 per cent di-tert-butyl trisulfide was admixed with agitation with a portion of the dry resin produced as described above. The methanol solvent was then removed from the admixture by vaporization. The resulting treated resin contained 2 per cent of its weight of di-tert-butyl trisulfide, and was tested for thermal stability in accordance with the procedure of Example II. A portion of the same resin, free from the added sulfide stabilizer, was simultaneously tested in exactly the same manner, as a control. The resulting test data are tabulated as follows:

| | Percent Loss in Weight at End of Test Period (325±2° F.) | | |
|---|---|---|---|
| Test Period, Hrs | 0.5 | 1 | 3 |
| Control | 5.3 | 7.2 | 10.4 |
| Dry 1-pentene-SO₂ resin containing 2.0 percent of its weight of di-tert-butyl trisulfide | 3.2 | 4.3 | 5.8 |

*Example VII*

A cyclohexene-sulfur dioxide resin latex was prepared at 50° F., for a 6 hour reaction period, in accordance with the following aqueous emulsion recipe:

| Materials charged: | Parts by weight |
|---|---|
| Cyclohexene | 56.8 |
| Sulfur dioxide | 78.2 |
| Water | 180.0 |
| Maprofix MM | 1.0 |
| Ammonium nitrate | 0.50 |

Cyclohexene conversion was 88.7 per cent. At the end of the reaction period, unreacted sulfur dioxide was vented from the reaction mixture. The resulting latex was coagulated by addition of methanol thereto with agitation. The slurry formed was filtered and the separated coagulum was water washed and then oven dried at 130–140° F. for 24 hours.

Methanol containing about 3 per cent of its weight in solution of di-tert-butyl trisulfide was added to a portion of the dried coagulum (dry cyclohexene-sulfur dioxide resin). The methanol solvent was then removed from the resulting admixture by vaporization. The resulting treated resin contained 2 per cent of its weight of di-tert-butyl trisulfide, and was tested for thermal stability in accordance with the procedure of Example II. A sample of the unstabilized cyclo-hexene-sulfur dioxide resin was simultaneously tested in exactly the same manner, as a control. The resulting test data are tabulated as follow:

| | Percent Loss in Weight at End of Test Period (325±2° F.) | | |
|---|---|---|---|
| Test Period, Hrs | 0.5 | 1 | 3 |
| Control | 3.8 | 6.3 | 15.3 |
| Dry cyclohexene-sulfur dioxide resin containing 2 percent of its weight of di-tert-butyl trisulfide | 3.2 | 5.6 | 11.6 |

As will be evident to those skilled in the art, various modifications can be made or followed, in the light of the foregoing disclosure and discussion, without departing from the spirit or scope of the disclosure or from the scope of the claims.

We claim:

1. A method for the preparation of an olefin-sulfur dioxide resin composition, comprising emulsifying a mono-olefinic organic compound in an emulsion of the oil-water type, and in the presence of sulfur dioxide in a mol ratio to said mono-olefinic compound greater than 1:1, effecting interreaction of said sulfur dioxide with said mono-olefinic compound to form a latex, introducing into intimate admixture with said latex an organic sulfide characterized by the structural formula

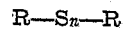

wherein R is selected from the group consisting of Y,

and

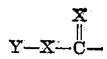

wherein Y is a radical selected from the group consisting of alkyl, alkenyl, aryl, alkaryl, aralkyl, cycloalkyl, cycloalkenyl, and such a radical containing at least one of the group consisting of sulfur and oxygen in an ether linkage, wherein X is selected from the group consisting of oxygen and sulfur, wherein $n$ is an integer of from 1 to 5, and wherein the total number of carbon atoms does not exceed 20, and recovering from the resulting latex admixture a sulfur dioxide-olefin resin of improved stability to thermal decomposition as a product of the process.

2. The method of claim 1 wherein the amount of said organic sulfide added to said latex is from 0.1 to 15 per cent by weight, based on the amount of dry olefin-sulfur dioxide resin in said latex.

3. A method for increasing the stability of a heteropolymeric resin to thermal decomposition, formed by the interreaction of sulfur dioxide and an unsaturated hydrocarbon which reacts with sulfur dioxide to form such a resin, which method comprises incorporating therewith an organic sulfide characterized by the structural formula

wherein R is selected from the group consisting of Y,

and

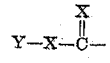

wherein Y is a radical selected from the group consisting of alkyl, alkenyl, aryl, alkaryl, aralkyl, cycloalkyl, cycloalkenyl, and such a radical containing at least one of the group consisting of sulfur and oxygen in an ether linkage, wherein X is selected from the group consisting of oxygen and sulfur, wherein $n$ is an integer of from 1 to 5 and wherein the total number of carbon atoms does not exceed 20.

4. A heteropolymeric composition comprising a heteropolymeric resin, formed by the interreaction of sulfur dioxide and an unsaturated hydrocarbon which reacts with sulfur dioxide to form such a resin, incorporated with an organic sulfide characterized by the structural formula

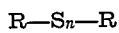

wherein R is selected from the group consisting of Y,

and

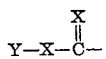

wherein Y is a radical selected from the group consisting of alkyl, alkenyl, aryl, alkaryl, aralkyl, cycloalkyl, cycloalkenyl, and such a radical containing at least one of the group consisting of sulfur and oxygen in an ether linkage, wherein X is selected from the group consisting of oxygen and sulfur, wherein $n$ is an integer of from 1 to 5 and wherein the total number of carbon atoms does not exceed 20.

5. A composition of claim 4 wherein said organic sulfide is an aryl sulfide.

6. A composition of claim 4 wherein said organic sulfide is an alkyl aryl sulfide.

7. A composition of claim 4 wherein said organic sulfide is an alkylxanthogen sulfide.

8. A composition of claim 4 wherein said unsaturated organic material is an open-chain mono-olefin.

9. A composition of claim 4 wherein said unsaturated organic material is a cyclomonoolefin.

10. A latex formed by the interreaction of sulfur dioxide with a monoolefinic organic compound containing not more than 20 carbon atoms in the molecule, in aqueous emulsion to form an olefin-sulfur dioxide resin, to which has been added from 0.1 to 15 per cent by weight of an organic sulfide characterized by the structural formula

wherein R is selected from the group consisting of Y,

and

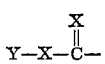

wherein Y is a radical selected from the group consisting of alkyl, alkenyl, aryl, alkaryl, aralkyl, cycloalkyl, cycloalkenyl, and such a radical containing at least one of the group consisting of sulfur and oxygen in an ether linkage, wherein X is selected from the group consisting of oxygen and sulfur, wherein $n$ is an integer of from 1 to 5 and wherein the total number of carbon atoms does not exceed 20, based on the weight of dry olefin-sulfur dioxide resin present.

11. A composition of matter comprising a product of coagulation of a latex formed by the interreaction of sulfur dioxide with a mono-olefin in aqueous emulsion to form an olefin-sulfur dioxide resin, and to which latex has been added from 0.1 to 15 per cent by weight of an organic sulfide characterized by the structural formula

wherein R is selected from the group consisting of Y,

and

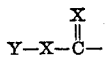

wherein Y is a radical selected from the group consisting of alkyl, alkenyl, aryl, alkaryl, aralkyl, cycloalkyl, cycloalkenyl, and such a radical containing at least one of the group consisting of sulfur and oxygen in an ether linkage, wherein X is selected from the group consisting of oxygen and sulfur, wherein $n$ is an integer of from 1 to 5 and wherein the total number of carbon atoms does not exceed 20, based on the weight of dry olefin-sulfur dioxide resin therein.

12. A process for the preparation of an improved olefin-sulfur dioxide resin comprising intermixing an aliphatic olefin mixture comprising butenes, with sulfur dioxide and water in proportions to produce a resulting reaction mixture containing said sulfur dioxide in a mol ratio to total olefin exceeding 1:1, and from 150 to 1000 parts by weight of water per 100 parts of total mono-olefin and sufficient to produce a final latex, including in said admixture an emulsifying agent which is effective in acid medium and a catalyst capable of inducing the reaction of sulfur dioxide with an olefin in the absence of light, maintaining said admixture emulsified at a reaction temperature within the limits of —10 and 60° C. for a time to react at least 50 per cent of said olefinic compound, introducing in a liquid vehicle an organic sulfide characterized by the structural formula

wherein R is selected from the group consisting of Y,

and

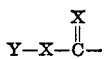

wherein Y is a radical selected from the group consisting of alkyl, alkenyl, aryl, alkaryl, aralkyl, cycloalkyl, cycloalkenyl, and such a radical containing at least one of the group consisting of sulfur and oxygen in an ether linkage, wherein X is selected from the group consisting of oxygen and sulfur, wherein $n$ is an integer of from 1 to 5 and wherein the total number of carbon atoms does not exceed 20, into intimate admixture with said final latex in an amount of from 0.3 to 3 per cent by weight based on the weight of dry resin therein, adding a coagulating agent to the resulting latex admixture so as to coagulate same, and recovering from a resulting slurry a dry olefin-sulfur dioxide resin composition as a product of the process.

13. The method of claim 1 wherein said organic sulfide is introduced into said latex, in a liquid vehicle.

14. The method of claim 3 wherein said unsaturated organic material is an open-chain mono-olefin.

15. The method of claim 3 wherein said unsaturated organic material is a cyclomonoolefin.

16. A heteropolymeric resin formed by the interreaction of sulfur dioxide with a pentene and containing from 0.1 to 15 per cent of its weight of di-tert-butyl trisulfide.

17. A mono-olefin-sulfur dioxide resin incorporated with from 0.1 to 15 per cent of its weight of di(isopropylxanthogen) disulfide.

18. A mono-olefin-sulfur dioxide resin incorporated with from 0.1 to 15 per cent of its weight of di-tert-butyl trisulfide.

19. A mono-olefin-sulfur dioxide resin incorporated with from 0.1 to 15 per cent of its weight of di-tert-amyl trisulfide.

20. A mono-olefin-sulfur dioxide resin incorporated with from 0.1 to 15 per cent of its weight of di-tert-butyl disulfide.

21. A mono-olefin-sulfur dioxide resin incorporated with from 0.1 to 15 per cent of its weight of phenyl ethyl sulfide.

22. A method for increasing the stability of a heteropolymeric resin to thermal decomposition, formed by the interreaction of sulfur dioxide and a butene, which method comprises incorporating di-tert-butyl trisulfide with said resin.

23. As a new composition, a heteropolymeric resin formed by the interreaction of sulfur dioxide and a butene, incorporated with di-tert-butyl trisulfide.

24. A heteropolymeric composition comprising a heteropolymeric resin formed by the reaction of sulfur dioxide and an unsaturated hydrocarbon which reacts with sulfur dioxide to form such a resin, incorporated with an alkyl sulfide containing not more than 20 carbon atoms in a molecule.

WILLIE W. CROUCH.
JOHN F. HOWE.

References Cited in the file of this patent

UNITED STATES PATENTS

| Number | Name | Date |
|---|---|---|
| 2,310,449 | Lightbown et al. | Feb. 9, 1943 |
| 2,481,596 | Irany et al. | Sept. 13, 1949 |
| 2,531,403 | Crouch et al. | Nov. 28, 1950 |